(12) United States Patent
Thomas et al.

(10) Patent No.: US 11,999,486 B2
(45) Date of Patent: Jun. 4, 2024

(54) DEVICE FOR CLOSING A PASSAGE BETWEEN TWO SEAT UNITS

(71) Applicant: Safran Seats, Plaisir (FR)

(72) Inventors: Mathieu Thomas, Bourges (FR); Lorene Perrin, Saint-Florent-sur-Cher (FR); Julien Layet, Merignac (FR)

(73) Assignee: Safran Seats, Plaisir (FR)

( * ) Notice: Subject to any disclaimer, the term of this patent is extended or adjusted under 35 U.S.C. 154(b) by 533 days.

(21) Appl. No.: 17/414,924

(22) PCT Filed: Dec. 10, 2019

(86) PCT No.: PCT/EP2019/084498
§ 371 (c)(1),
(2) Date: Jun. 16, 2021

(87) PCT Pub. No.: WO2020/126696
PCT Pub. Date: Jun. 25, 2020

(65) Prior Publication Data
US 2022/0063809 A1 Mar. 3, 2022

(30) Foreign Application Priority Data
Dec. 18, 2018 (FR) ...................................... 1873133

(51) Int. Cl.
*B64D 11/00* (2006.01)
*B64D 11/06* (2006.01)
(52) U.S. Cl.
CPC ...... *B64D 11/0023* (2013.01); *B64D 11/0606* (2014.12)

(58) Field of Classification Search
CPC ............ B64D 11/0023; B64D 11/0606; B64C 1/1438; B64C 1/1469
See application file for complete search history.

(56) References Cited

U.S. PATENT DOCUMENTS

| 10,066,430 B2 * | 9/2018 | Joussellin ............. B64C 1/1438 |
| 2018/0148157 A1 * | 5/2018 | Vayssiere ............. B64C 1/1438 |
| 2018/0281963 A1 | 10/2018 | Dowty et al. |

(Continued)

FOREIGN PATENT DOCUMENTS

| EP | 3225548 A1 | 10/2017 |
| GB | 2548901 A | 10/2017 |

(Continued)

OTHER PUBLICATIONS

International Patent Application No. PCT/EP2019/084498, International Search Report (and English translation) and Written Opinion, dated Feb. 26, 2020.

*Primary Examiner* — Richard Green
(74) *Attorney, Agent, or Firm* — Kilpatrick Townsend & Stockton LLP

(57) ABSTRACT

A closure device for a passage located in a cabin of an aircraft including a door panel and a first carriage having first guide means (slide device) for translationally guiding the first carriage and second guide means (guiding groove) for translationally guiding the door panel. A first locking system is able to assume a locked state, in which the first locking system provides a mechanical connection between the door panel and the first carriage and is able to transition to an unlocked state, in which the door panel is disengaged from the carriage.

18 Claims, 9 Drawing Sheets

(56) References Cited

U.S. PATENT DOCUMENTS

2019/0210733 A1  7/2019  Herault et al.
2020/0122838 A1  4/2020  Bonnefoy et al.

FOREIGN PATENT DOCUMENTS

| WO | 2016164352 A1 | 10/2016 |
| WO | 2017066559 A1 | 4/2017 |
| WO | 2018033599 A1 | 2/2018 |
| WO | 2018184778 A1 | 10/2018 |

\* cited by examiner

[Fig. 1a]
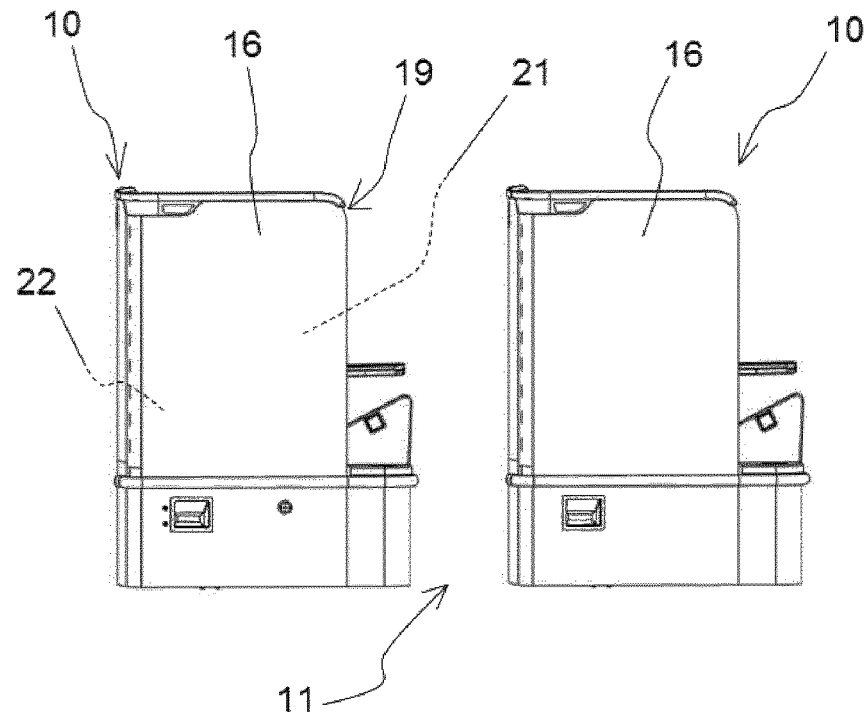
[Fig. 1b]
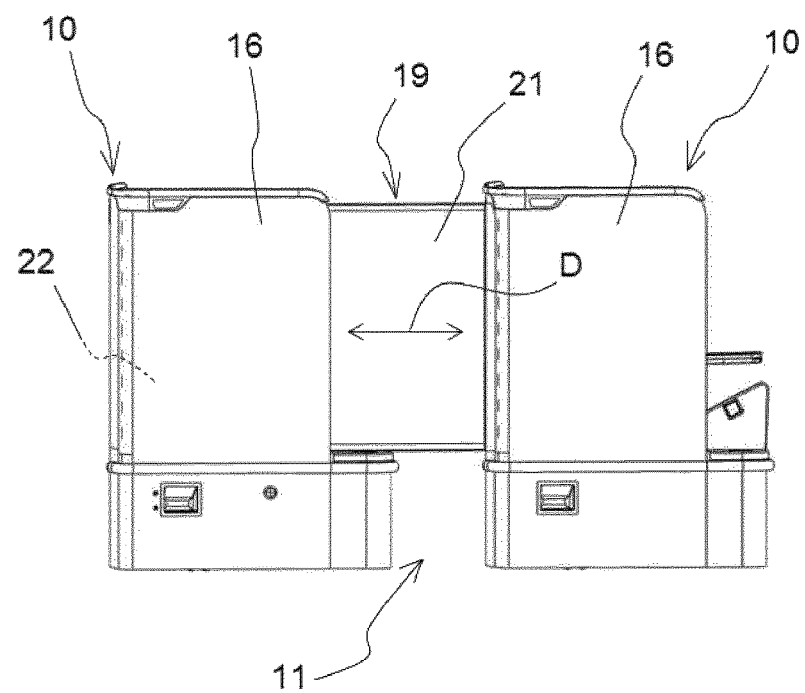

[Fig. 2]
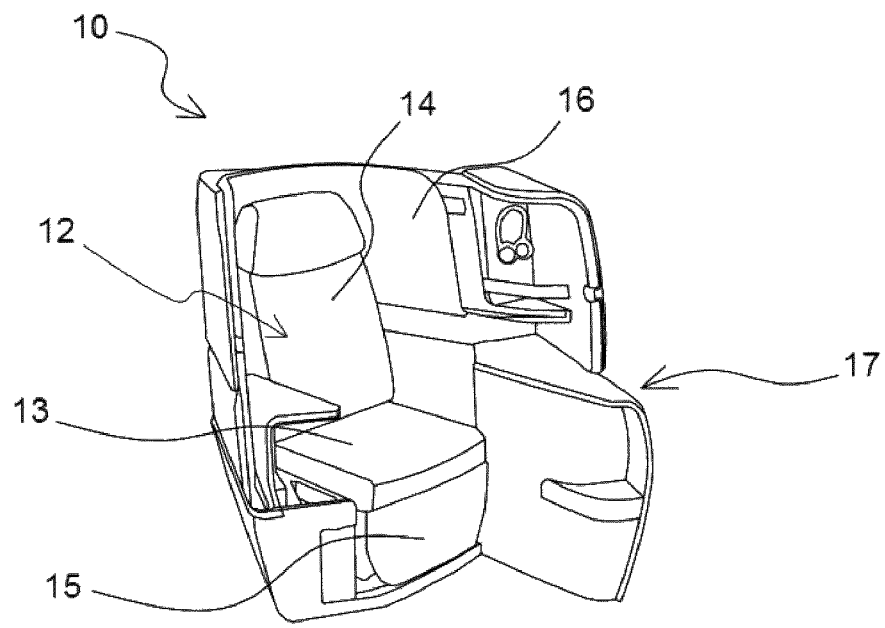
[Fig. 3]
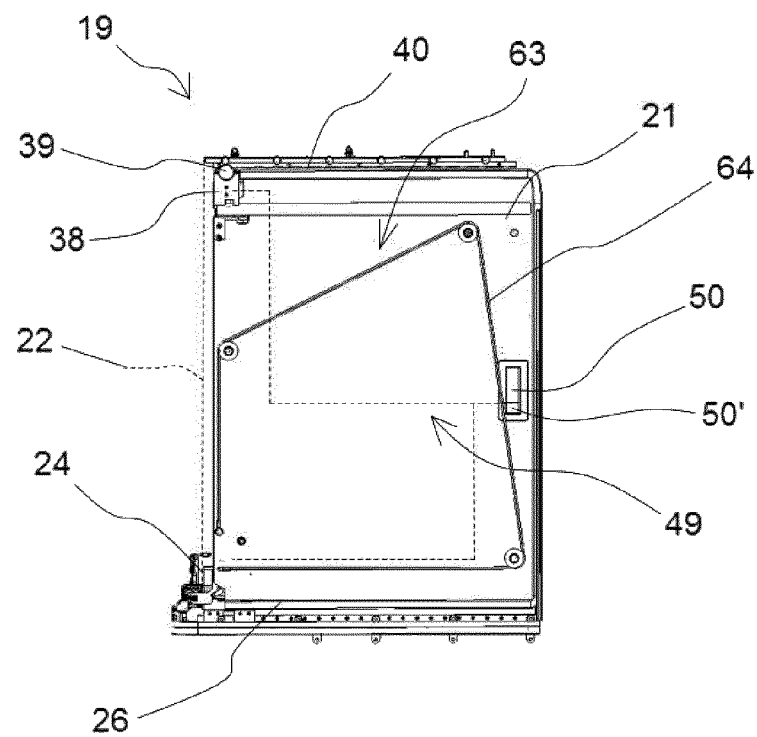

[Fig. 4]
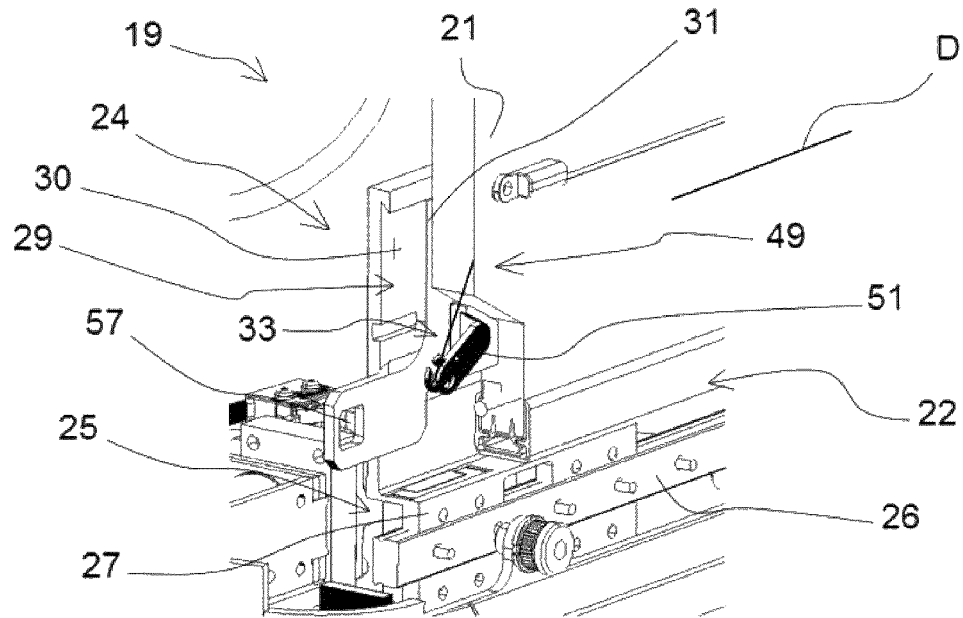
[Fig. 5a]
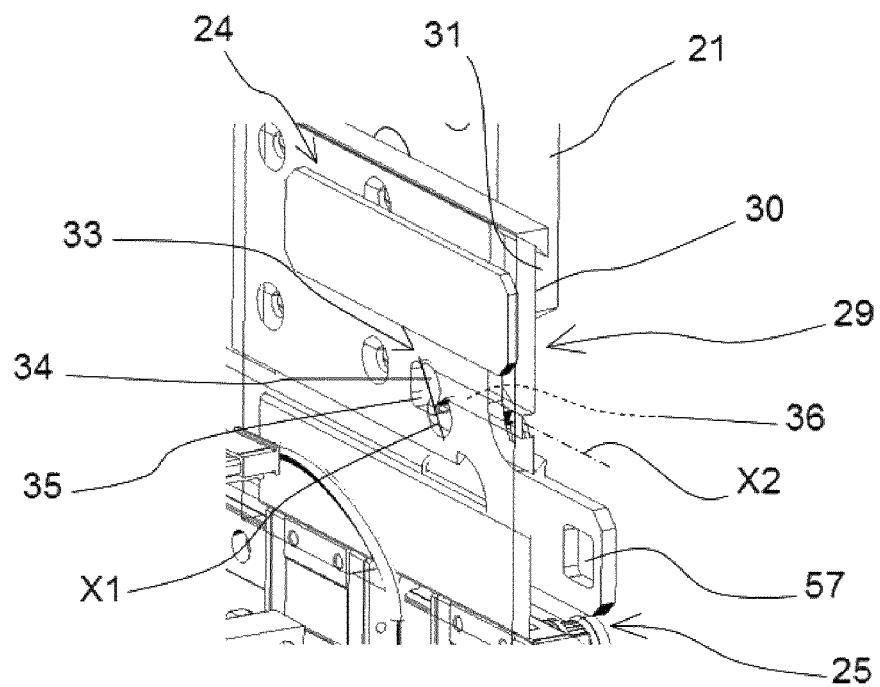

[Fig. 5b]
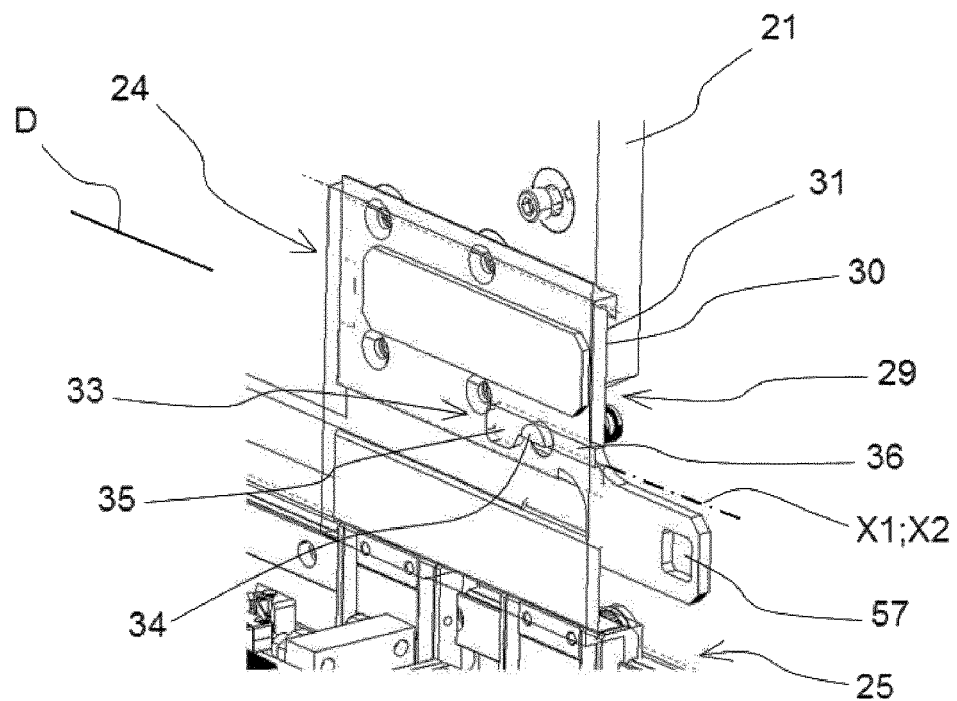
[Fig. 6]
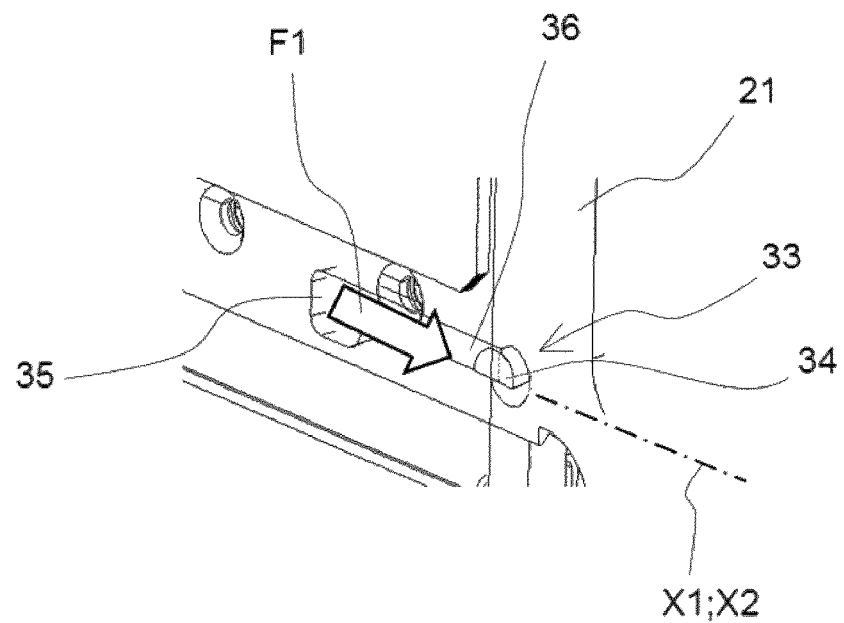

[Fig. 7]
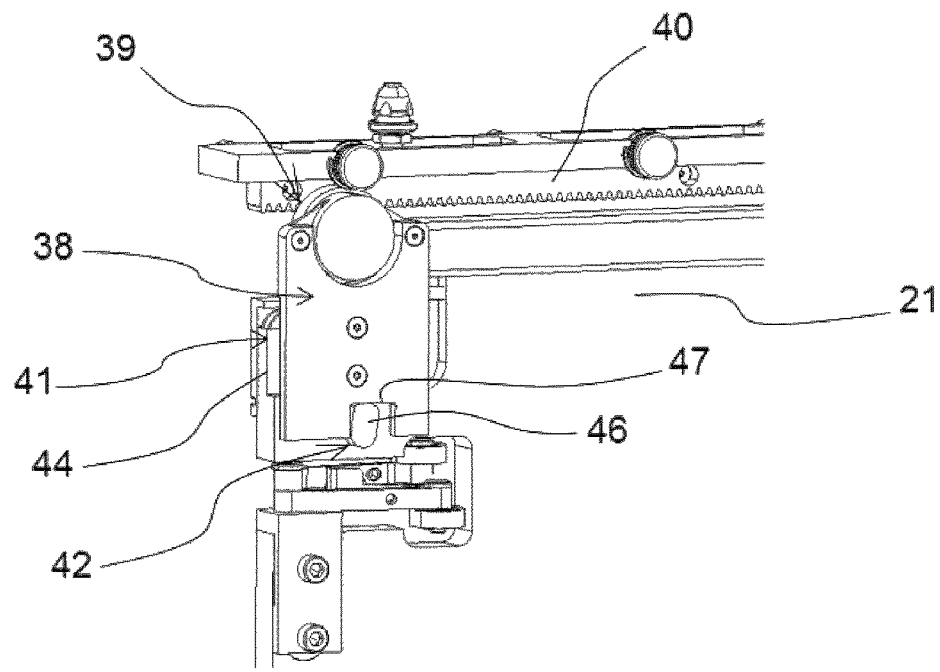
[Fig. 8]
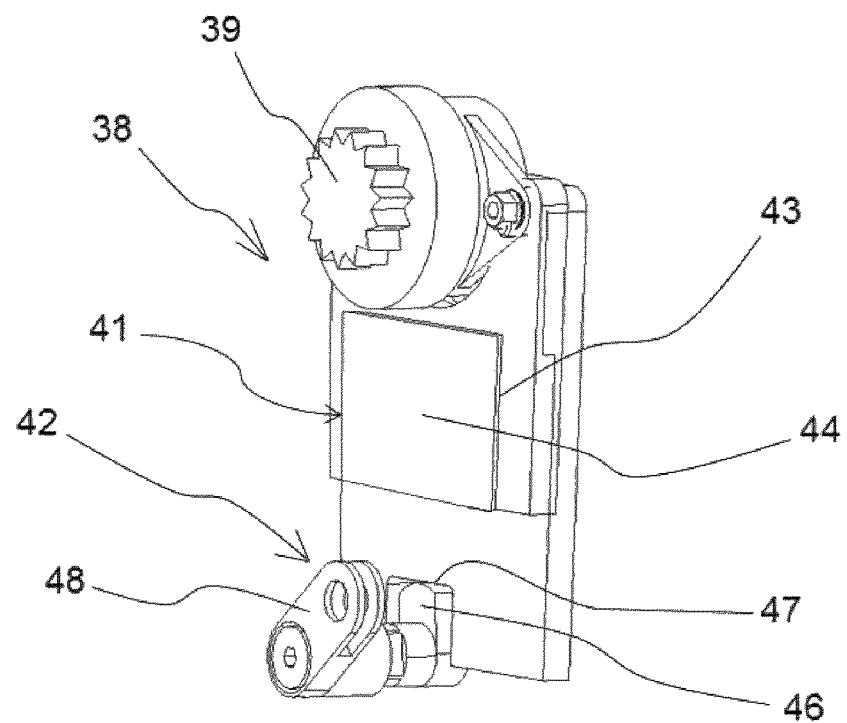

[Fig. 9a]
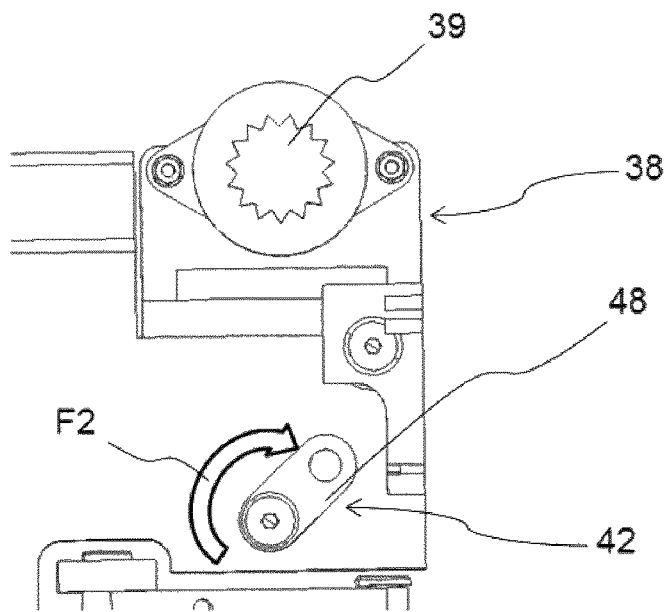
[Fig. 9b]
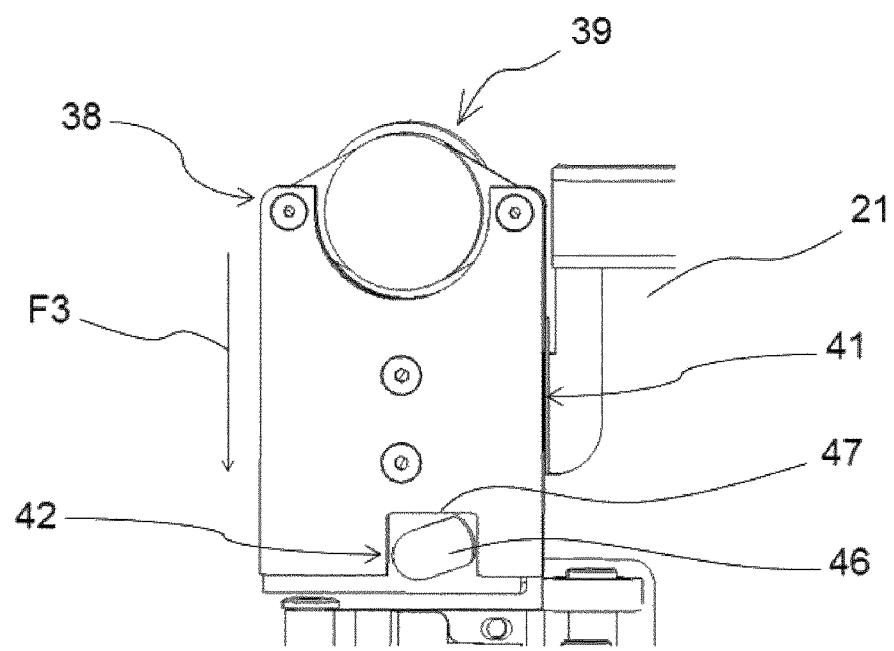

[Fig. 10]
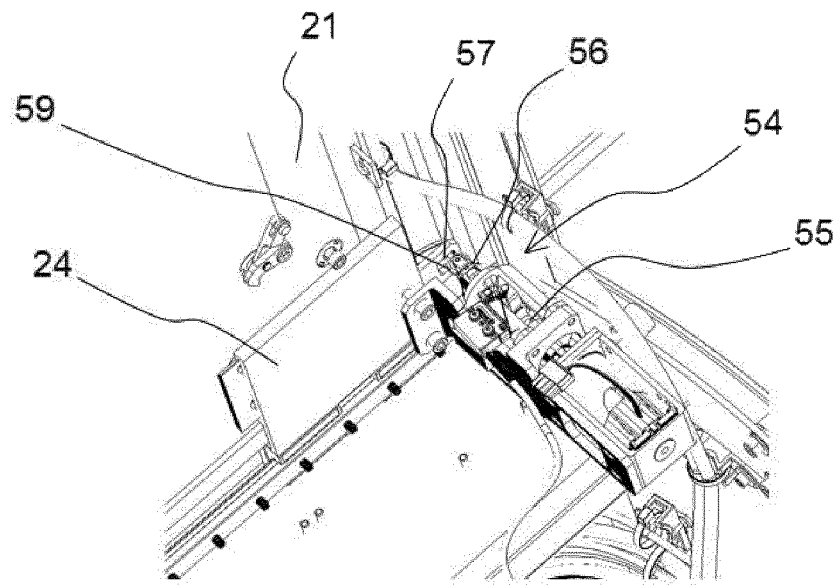
[Fig. 11a]
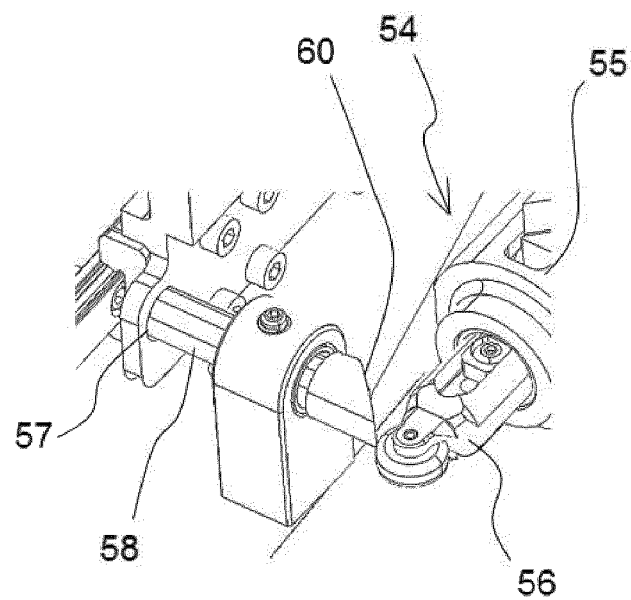

[Fig. 11b]
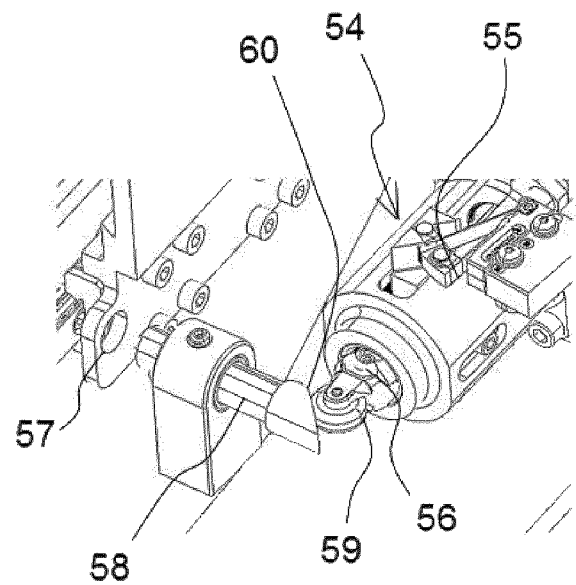
[Fig. 12a]
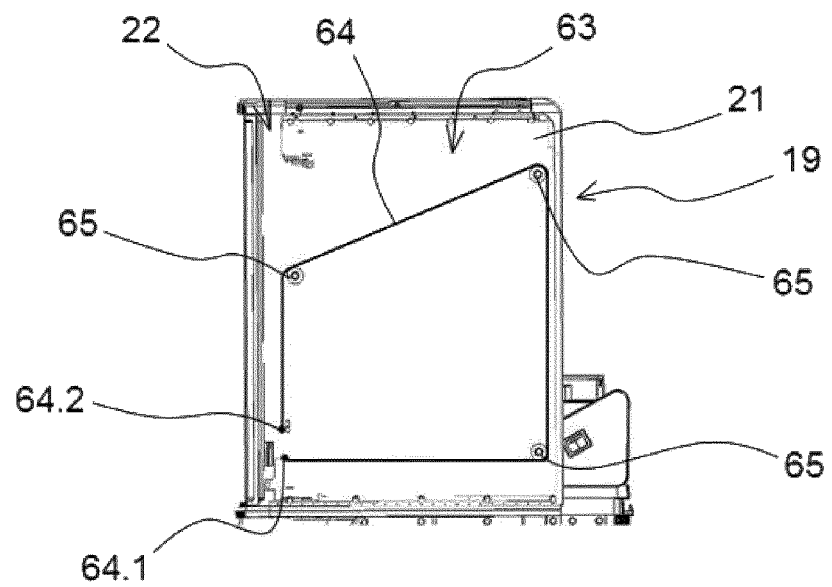

[Fig. 12b]
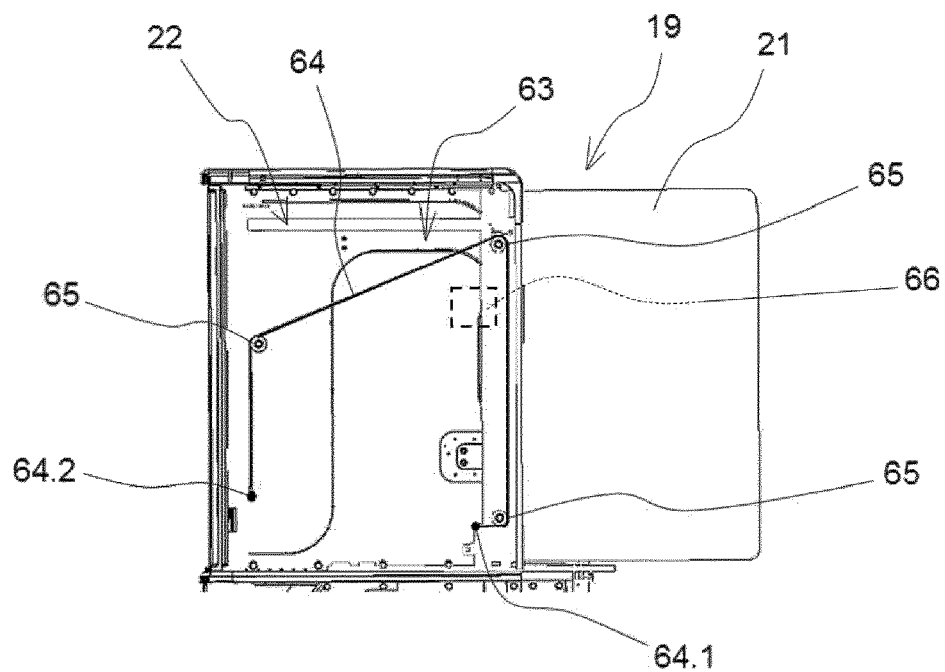
[Fig. 13]
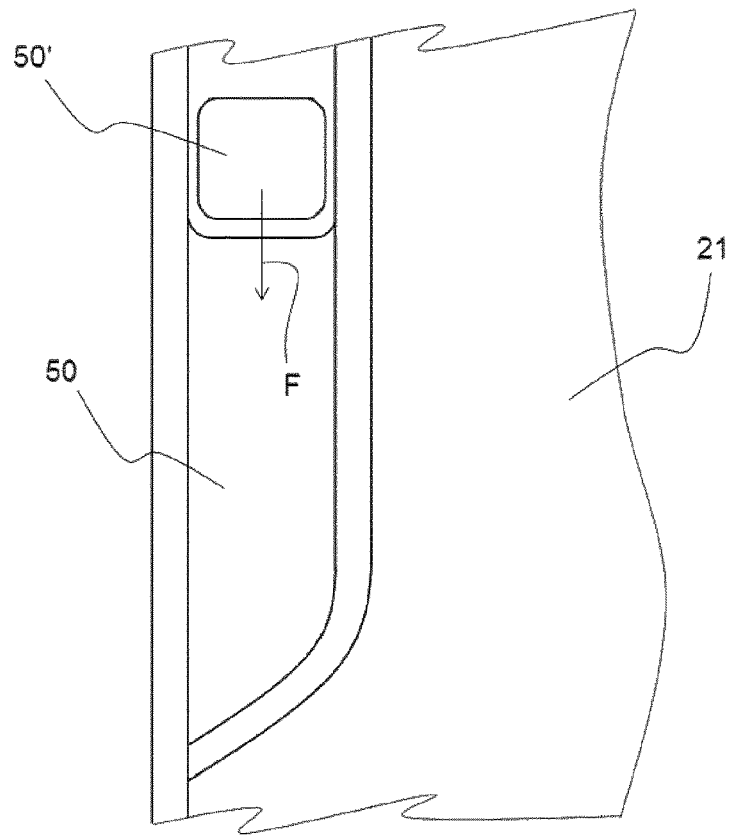

DEVICE FOR CLOSING A PASSAGE BETWEEN TWO SEAT UNITS

CROSS-REFERENCE TO RELATED APPLICATIONS

This application is a national stage application of International Patent Application PCT/EP2019/084498, filed on Dec. 10, 2019 and titled "Device for Closing a Passage Between Two Seat Units," which claims priority to France Patent Application No. 1873133, filed on Dec. 18, 2018, both of which are hereby incorporated by reference in their entireties.

The present invention relates to a closing device for a passage between two seating units. The invention finds a particularly advantageous application in the field of aircrafts.

Seats of the 'business class' and 'first class' type offer passengers different comfort positions, from a 'sitting' position to a 'lying' position in which the seat defines a substantially horizontal sleeping surface so that the passenger can lie down.

Intermediate comfort positions are also offered, such as the 'relaxing' position in which a backrest of the seat is strongly inclined. Generally, these intermediate positions are obtained by the inclination of the pivoting backrest about a horizontal axis and perpendicular to an axis of extension of the seat. The passenger can then remain in the seat during transitions among the different positions.

The seat is generally formed of the backrest and a seating surface and may comprise a leg rest and/or a footrest, which can be fixed or bound to a kinematic seat.

The assemblies of aircraft cabin seats of the 'business class' and 'first class' type include a passage between two seat units arranged behind one another along a longitudinal axis of the aircraft cabin, allowing direct access to an aisle for all passengers. Passengers can thus have easy access to the aisle, in particular when the seat is in the 'lying' position.

Therefore, when a passenger or a member of the crew walks in the lateral aisle respect to the seat, there is likely to be direct visual contact with the passenger seated in the seat. Such a situation can bring a feeling of discomfort to the seated passenger, in that s/he feels a lack of privacy.

Document US2018/0281963 describes a closing device for a passage between two seating units behind one another. This closing device comprises a sliding door mounted between a stored position, in which the door leaves the passage unobstructed, and an extended position, in which the door closes the passage. Such a configuration makes it possible to define an enclosed interior space around the seat, which provides the passenger with a feeling of privacy. Such a configuration according to the state of the art allows the passenger in the seat not to be at the direct sight of other passengers and/or crew members walking in the aisle. Documents EP3225548 and GB2548901 describe a similar closing device.

In case of malfunction of such devices, the passenger can rotate the door along a vertical hinge in order to clear the space between the seats and have access to the aisle. However, in such a configuration, the door is liable to obstruct the passage when it is pivoted with respect to its usual position.

The invention aims at effectively remedying these drawbacks by providing a closing device, in particular for a passage in an aircraft cabin, comprising:
a door panel, and
a first carriage comprising first guiding means for translating said first carriage with respect to a fixed element in a sliding direction,
characterized in that said first carriage comprises second guiding means for translating the door panel with respect to said first carriage in said sliding direction, and
a first locking system being able to come into a locked state, in which the first locking system provides a mechanical connection between the door panel and the first carriage, so that the door panel is translatable together with the first carriage via said first guiding means,
said first locking system being able to come into an unlocked state, in particular in the event of a malfunction, in which the door panel is disengaged from the first carriage, so that the door panel alone is translatable via said second guiding means.

The invention may implement a first and second locking systems that are in the locked state when used by the passenger in order so as to respectively fix the door panel to the displacement carriage and allow the damping pinion to be meshed with a rack. These locking systems can come into the unlocked state in an emergency situation so as to allow the door panel to be removed from the passage in a translational movement. In addition, a blocking system that can be used by the crew will be able to block the deployment of the door panel when the seat is in the TTL (Taxi, Take-off, Landing) position.

Thus, when allowing the door panel to slide in case of malfunction of the closing device, the invention enables to prevent the passenger path from being obstructed in case of an evacuation procedure. In addition, the second guiding means make the movement of the door panel in case of emergency easier, as well as the reassembly thereof in a normal operating mode.

According to one embodiment, the first guiding means comprise a slide device.

According to one embodiment, the second guiding means comprise a guiding groove in one of the elements of the carriage and the door panel and a male portion with a complementary shape provided in the other element of said first carriage and the door panel.

According to one embodiment, the guiding groove has a dovetail-shaped section.

According to one embodiment, the first locking system comprises a rotary cam, said cam being arranged inside a housing into which a release groove opens.

According to one embodiment, the cam is movable between:
a locking position in which said cam abuts against one end of the release groove, and
an unlocking position in which an axis of the cam is aligned with an axis of the release groove to allow a relative movement of the door panel with respect to the first carriage.

According to one embodiment, said closing device comprises a second carriage provided with a damping pinion for damping and controlling the speed of a movement of the door panel and cooperating with a rack mounted on a fixed element.

According to one embodiment, the second carriage comprises vertical guiding means for vertically translating said second carriage with respect to the door panel and a second locking system being able to come into a locked state in which said locking system maintains the second carriage in an upper position so that the teeth of the damping pinion cooperate with the rack, and into an unlocked state in which said second carriage can move into a lower position so that the teeth of the damping pinion are removed from the rack.

According to one embodiment, the second locking system comprises a cam and a corresponding notch in the door panel, said cam being rotatable between a first position in which a first peripheral portion of the cam abuts again an upper end of the notch so that the second carriage is in the upper position and a second position in which a second peripheral portion of the cam abuts against the upper end of the notch so that the second carriage is in a lower position.

According to one embodiment, said closing device comprises a control device, in particular provided with cables and movement control means, for controlling a movement of at least one cam from one position to another. The control device makes it possible to reinitialize the system and return to the initial deployment mode.

According to one embodiment, said closing device comprises a blocking system for the door panel in the stored position.

According to one embodiment, the blocking system comprises an electric linear actuator including a rod translatable between a released position in which the rod is disengaged from a corresponding housing in a portion of the first carriage and a locking position in which the rod cooperates with the housing of the first carriage to prevent any movement of the door panel. Such a system makes it possible to block the deployment of the door panel, but allows in any case the reopening of the door panel and the holding thereof in the open (stored) position.

According to one embodiment, said closing device comprises a device for automatically deploying the door panel from a stored position to a deployed position.

According to one embodiment, the automatic deployment device comprises an elastic strap as well as a plurality of guiding means for said strap, such as pulleys, arranged between a first end of said strap fixed to the door panel and a second end of said strap fixed to a fixed part.

The present invention will be better understood and other features and advantages will become apparent on reading the following detailed description including embodiments, given as illustrative examples, with reference to the accompanying figures, given as non-limiting examples, which could be used to completely understand the present invention and the description of its implementation and which could contribute, if need be, to its definition, in which:

FIGS. 1a and 1b are side views illustrating a closing device according to the invention respectively in the stored position and in the deployed position;

FIG. 2 is a perspective view of a seat unit usable with the closing device according to the invention;

FIG. 3 is a side view of a closing device according to the invention;

FIG. 4 is a detailed perspective view of the first carriage of the closing device according to the invention;

FIGS. 5a and 5b are perspective views respectively illustrating a locked state and an unlocked state of the locking system of the first carriage of the closing device;

FIG. 6 shows a detailed view illustrating a movement of the cam of the locking system within the release groove;

FIG. 7 shows a perspective view of the second carriage of the closing device according to the invention provided with a damping pinion cooperating with a rack;

FIG. 8 is a perspective view of the second carriage of the closing device according to the invention;

FIGS. 9a and 9b are views along two different sides of the second carriage of the device illustrating the passage from the upper position to the lower position of the carriage for disengaging the teeth of the pinion from the rack;

FIG. 10 shows a perspective view of a first embodiment of a blocking system for the door panel according to the invention;

FIGS. 11a and 11b show a perspective view of a second embodiment of a blocking system for the door panel according to the invention respectively in the locked position and in the released position;

FIGS. 12a and 12b show side views illustrating the operation of an automatic deployment system for the door panel from the stored position to the deployed position;

FIG. 13 is a schematic representation of an unlocking member for the door panel integrated in a handle.

It should be noted that in the figures the structural and/or functional elements common to the different embodiments may have the same references. Thus, unless otherwise stated, such elements have identical structural, dimensional and material properties.

FIGS. 1a and 1b show two consecutive seat units 10 separated by a passage 11. It is recalled that the seat unit 10 comprises a seat 12 having a seating surface 13, a backrest 14 and optionally a leg rest 15, as it is shown in FIG. 2. The seat unit 10 also comprises a privacy shell 16 at least partially surrounding the seat 12 as well as a console 17 forming in particular a storage space for the passenger. The passage 11 is arranged so as to allow the passenger to move from the seat to an aisle.

A closing device 19 is able of closing the passage 11. Such a closing device 19 thus makes it possible to define, in particular in cooperation with the fixed shell 16 and/or the console 17 of the front seat unit 10, an enclosed space around the seat 12.

When the closing device 19 is deployed, the passage 11 between two consecutive seat units 10 is closed by the closing device 19. The closing device 19 is able of moving in a rectilinear sliding direction D.

Accordingly, the passenger in the seat 12 is separated from any passenger and/or crew member walking in the aisle by the closing device 19. The passenger is thus seated in a zone of privacy defined by the enclosed space thus created.

More specifically, the closing device 19 comprises a door panel 21 movable between a stored position and a deployed position in the direction D. In the stored position, the door panel 21 is predominantly in a housing 22 formed in the shell 16 of a seat unit 10 so as to free the passage 11, as it is shown in FIG. 1a. In the deployed position, a major part of the door panel 21 is located outside the housing 22, so as to close the passage 11, as it is shown in FIG. 1b.

As it can be seen in FIG. 3 and more particularly in FIG. 4, a first carriage 24 comprises first guiding means 25 for translating said carriage 24 with respect to a fixed component of the seat unit 10 in the sliding direction D. The first guiding means 25 comprise a slide device having a longitudinal slide 26 fixed to the fixed element of the seat unit, in particular inside the housing 22, and cooperating with a complementary form 27 in the carriage 24.

The carriage 24 further comprises second guiding means 29 for translating the door panel 21 with respect to the carriage 24 in the sliding direction D. The second guiding means 29 comprise a guiding groove 30 in the carriage 24 and a male portion 31 of complementary form in the door panel 21. As a variant, the structure could of course be reversed, that is to say that the guiding groove 30 may be provided in the door panel 21 and the complementary male portion 31 may be provided in the carriage 24.

The guiding groove 30 has a dovetail-shaping section, that is to say a generally trapezoidal section, so as to maintain the male portion 31 inside the guiding groove 30. As a variant, any other shape of the groove 30 suitable for the application can be envisaged.

A first locking system 33 is adapted to come into a locked state, in which said locking system 33 provides a mechanical connection between the door panel 21 and the first carriage 24, so that the door panel 21 can be translated together with the first carriage 24 via said first guiding means 25. The door panel 21 can thus be movable between the stored position and the deployed position, via the movement of the carriage 24. The second guiding means 29 are then blocked by the locking system 33.

The locking system 33 is able to come into an unlocked state, in particular in case of a malfunctioning of the closing device 19, in which the door panel 21 is disengaged from the carriage 24, so that the door panel 21 can only be translated from the deployed position to the stored position via said second guiding means 29.

According to an exemplary embodiment, the locking system 33, visible in FIGS. 5a, 5b and 6, includes a cam 34 rotatably mounted on the door panel 21. The cam 34 is disposed inside a housing 35 into which opens a release groove 36 of elongated shape. The cam 34 can rotate between a locking position (corresponding to the locked state of the system 33) and an unlocking position (corresponding to the unlocked state of the system 33). Alternatively, the cam 34 can be mounted on the carriage 24 or any other part having the same rectilinear movement as the door panel 21 and/or the carriage 24.

In the locking position, the cam 34 abuts against an end of the release groove 36 (see FIG. 5a}. An axis X1 of the cam 34 extending along its greatest dimension is then not aligned with an axis X2 of the release groove 36. The cam 34 being locked in translation on one side by the end of the groove 36 and on the other side by a lateral face of the housing 35, the door panel 21 can integrally translate together with the carriage 24.

In the unlocking position activated by an unlocking member 50' incorporated into the handle 50, the axis X1 of the cam 34 aligns with the axis X2 of the release groove 36, so as to be able to slide inside the groove 36 along the arrow F1 (see FIGS. 5b and 6}. This ensures a relative movement of the door panel 21 with respect to the carriage 24, so that the door panel 21 alone is movable between the deployed position and the stored position.

As it can be seen in FIGS. 7 and 8, a second carriage 38 is provided with a damping pinion 39 for the movement of the door panel 21 intended to cooperate with a rack 40 mounted on a fixed element of the seat unit 10. The damping pinion 39 may have the form of a friction pinion of a known type.

The second carriage 38 includes vertical guiding means 41 for vertically translating the second carriage 38 with respect to the door panel 21 and a second locking system 42. The vertical guiding means 41 comprises a guiding groove 43 in the carriage 38 and a male portion 44 of complementary shape provided in the door panel 21. As a variant, the structure may of course be reversed, that is to say that the guiding groove 43 may be provided in the door panel 21 and the complementary form 44 may be provided in the carriage 38. The vertical guiding means 41 make it possible to move the carriage 38 in a direction perpendicular to the sliding direction D. The guiding groove 43 has a dovetail-shaped section, that is to say a section having generally trapezoidal shape so as to maintain the male portion 44 inside the guiding groove 43. As a variant, any other shape of the groove 43 suitable for the application can be envisaged.

The second locking system 42 is able of coming into a locked state in which said locking system 42 maintain the second carriage 38 in an upper position, so that the teeth of the damping pinion 39 cooperate with the rack 40, and an unlocked state allowing the second carriage 38 to move to a lower position, via the second guiding means 41, so that the teeth of the damping pinion 39 are disengaged from the rack 40. This eliminates the friction force to allow an easy movement of the carriage 38 from the deployed position to the stored position in an emergency situation.

For this purpose, the second locking system 42 comprises a cam 46 and a corresponding notch 47 in the door panel 21. The cam 46 is rotatable between a first position in which a first peripheral portion of the cam 46 bears against an upper end of the notch 47 so that the carriage 38 is in the upper position, as it is shown in FIGS. 7 and 8, and a second position in which a second peripheral portion of the cam 46 bears against the upper end of the notch 47 so that the carriage 38 is in the lower position, as it is shown in FIG. 9b. Thus, a rotation of the cam 46 along the arrow F2 with the help of a control arm 48 (see FIG. 9a) causes the carriage 38 to move vertically downward along the arrow F3.

A control device 49, in particular provided with cables and movement control means, allows to control a displacement of the cams from one position to another by operating an unlocking member 50', such as a button sliding along the arrow F or a lever, integrated in a handle 50 on one side of the door panel 21, as it is shown in FIGS. 3, 4, and 13.

Thus, in a normal operating mode, the carriage 24 and the door panel 21 are movable along the rectilinear sliding direction D while having a damped movement of the door panel 21 at the end of travel due to the damping pinion 39 engaged with the rack 40. The two locking systems 33, 42 are then in a locked state.

In an emergency operating mode, the passenger may actuate the unlocking member 50' so that the cam 34 of the first locking system 33 can move via a corresponding cable from the locked position to the unlocked position in which the axis X1 of the cam 34 aligns with the axis X2 of the release groove 36 so as to allow the door panel 21 to move with respect to the first carriage 24, as it is shown in FIGS. 5b and 6. It should be noted that the cable can be fixed to one end of a control arm 51 of the cam 34.

Simultaneously, the cam 46 of the second unlocking system 42 is also moved via a corresponding cable so as to move the second carriage 38 from the upper position to the lower position and disengage the teeth of the damping pinion 39 from the rack 40, as it is shown in FIGS. 9a and 9b. The movement of the door panel 21 can thus be carried out in the direction D without being hindered by the friction forces of the pinion 39.

It should be noted that the present invention is reversible, in the sense that a reverse operation makes it possible to reassemble the door panel 21 on the carriage 24 by a movement of the door panel 21 towards the carriage 24 in the sliding direction D. For this purpose, the locking cam 34 is inserted inside the release groove 36 through its end open towards the rear of the seat and then moved until the cam 34 cooperates with its housing 35. An actuation of the unlocking member 50' makes it possible to cause the cam 34 to rotate into the locked position in which the axis X1 of the cam 34 is inclined, or even transverse, with respect to the axis X2 of the release groove 36.

The second guiding means 29 makes the restoring of the lock system 33 easier by ensuring that the cam 34 is aligned with the release groove 36 during the resetting of the system.

The reverse actuation of the unlocking member 50' further causes the cam 46 to rotate upwardly so as to raise the carriage 38 in the upper positron. This ensures that the damping pinion 39 cooperates with the teeth of the rack 40.

Furthermore, the closing device 19 includes a blocking system 54 for the door panel 21 in the stored position. This blocking system 54 is intended to be used by the crew in order to ensure in particular that the door panel is in the stored position when the seat is in the TTL position (Taxi, Take-off, Landing) during stopping, taking-off, and landing phases of the aircraft.

In the example shown in FIG. 10, the blocking system 54 includes an electric linear actuator 55 having a rod 56 translatable between a released position in which the rod 56 is disengaged from a corresponding housing 57 in a portion of the first carriage 24 and a blocking position in which the rod 21 cooperates with the housing 57 of the carriage 24 to prevent any movement of the door panel 21, under normal operating conditions. The rod 56 of the actuator 55 is in this case oriented perpendicular to the door panel 21. The rod 56 may carry a wheel 59 at its end to make its insertion inside the housing 57 easier.

Alternatively, as it is shown in FIGS. 11a and 11b, the rod 56 of the actuator 55 is oriented parallel to the door panel 21. In this case, the rod of the actuator 55 is coupled with a pin 58 via a return device formed by a wheel 59 arranged at one end of the rod 56 cooperating with a beveled shape 60 of the pin 58.

The electrical actuator 55 may be controlled by a centralized system allowing the crew to block in the stored position all the door panels 21 in a single control operation.

Advantageously, there is provided an automatic deployment device 63 for the door, as shown in FIGS. 12a and 12b. The automatic deployment device 63 comprises an elastic strap 64 as well as a plurality of guiding means for the strap 64, such as pulleys 65, arranged between a first end 64.1 of said strap 64 fixed to the door panel 21 and a second end 64.2 of said strap 64 fixed to a fixed part, for example to an internal portion of the housing 22. When the door panel 21 is in the stored position, the strap 64 is stretched (see FIG. 12a). An action from the passenger on a control button 66 on the side of the seat 12 allows the strap 64 to be released and the door panel 21 to automatically come into the deployed position (see FIG. 12b).

As a variant, the automatic deployment device 63 comprises a spring reel provided with a cable having one end fixed to the door.

Of course the different features, variants and/or embodiments of the present invention can be associated with one another in various combinations insofar as they are not incompatible or exclusive with one another.

Obviously, the invention is not limited to the embodiments described above and provided by way of example only. It encompasses various modifications, alternative forms and other variants a person skilled in the art may consider in the context of the present invention and in particular any combination of the various operating modes described above, which may be taken separately or in combination.

The invention claimed is:

1. A closing device for a passage in an aircraft cabin, comprising:
a door panel, and
a first carriage comprising first guiding means for translating said first carriage with respective to a fixed element in a sliding direction, characterized in that said first carriage comprises second guiding means for translating the door panel with respect with said first carriage in said sliding direction, and
a first locking system being able to come into a locked state in which the first locking system provides a mechanical connection between the door panel and the first carriage, so that the door panel is translatable together with the first carriage via said first guiding means,
said first locking system being able to come into an unlocked state, in which the door panel is disengaged from the first carriage, so that the door panel alone is translatable via said second guiding means.

2. The closing device according to claim 1, characterized in that the first guiding means comprise a slide device.

3. The closing device according to claim 1, characterized in that the second guiding means comprise a guiding groove in one of the elements of the first carriage and the door panel and a male portion with complementary shape provided in the other element of said first carriage and the door panel.

4. The closing device according to claim 3, characterized in that the guiding groove has a dovetail-shaped section.

5. The closing device according to claim 1, characterized in that the first locking system comprises a rotary cam, said cam being arranged inside a housing into which opens a release groove.

6. The closing device according to claim 5, characterized in that the cam is movable between:
a locking position in which said cam abuts against one end of the release groove, and
an unlocking position in which an axis of the cam is aligned with an axis of the release groove to allow a relative movement of the door panel with respect to the first carriage.

7. The closing device according to the claim 5, characterized in that it comprises a control device for controlling a movement of the cam from one position to another.

8. The closing device according to claim 7, wherein the control device comprises cables.

9. The closing device according to claim 1, characterized in that it comprises a second carriage provided with a damping pinion for damping a movement of the door panel and cooperating with a rack mounted on a the fixed element.

10. The closing device according to claim 9, characterized in that the second carriage comprises vertical guiding means for vertically translating said second carriage with respect to the door panel and a second locking system being able to come into a locked state in which said locking system maintains the second carriage in an upper position so that teeth of the damping pinion cooperate with the rack, and into an unlocked state in which said second carriage can move into a lower position so that the teeth of the damping pinion are removed from the rack.

11. The closing device according to claim 10, characterized in that the second locking system comprises a cam and a corresponding notch in the door panel, said cam being rotatable between a first position in which a first peripheral portion of the cam abuts against an upper end of the notch so that the second carriage is in the upper position and a second position in which a second peripheral portion of the cam abuts against the upper end of the notch so that the second carriage is in the lower position.

12. The closing device according to claim 11, characterized in that in comprises a control device for controlling a movement of the cam from one position to another.

13. The closing device according to claim 1, characterized in that it comprises a blocking system for the door panel in a stored position.

14. The closing device according to claim 13, characterized in that the blocking system comprises an electric linear actuator including a rod translatable between a released position in which the rod is disengaged from a corresponding housing in a portion of the first carriage and a locking position in which the rod cooperates with the housing of the first carriage to prevent any movement of the door panel.

15. The closing device according to claim 1, characterized in that it comprises a device for automatically deploying the door panel from a stored position to a deployed position.

16. The closing device according to claim 15, characterized in that the automatic deployment device comprises an elastic strap as well as a plurality of guiding means for said strap, such as pulleys, arranged between a first end of said strap fixed to the door panel and a second end of said strap fixed to a fixed part.

17. The closing device according to claim 16, wherein the plurality of guiding means comprise pulleys.

18. The closing device according to claim 1, wherein said first locking system being able to come into the unlocked state in the event of a malfunction.

\* \* \* \* \*